(12) United States Patent
Henvy et al.

(10) Patent No.: US 12,032,551 B2
(45) Date of Patent: *Jul. 9, 2024

(54) TECHNIQUES AND ARCHITECTURES FOR DATA FIELD LIFECYCLE MANAGEMENT

(71) Applicant: Salesforce, Inc., San Francisco, CA (US)

(72) Inventors: Kelly Henvy, Salem, OR (US); Aaron Slettehaugh, San Ramon, CA (US); Avrom Irwin Roy-Faderman, Sunnyvale, CA (US); Anna Lisa Davies, Corte Madera, CA (US)

(73) Assignee: Salesforce, Inc., San Francisco, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/164,733

(22) Filed: Feb. 1, 2021

(65) Prior Publication Data

US 2021/0232563 A1   Jul. 29, 2021

Related U.S. Application Data

(63) Continuation of application No. 15/445,625, filed on Feb. 28, 2017, now Pat. No. 10,909,103.

(51) Int. Cl.
G06F 16/23   (2019.01)
(52) U.S. Cl.
CPC ................... G06F 16/23 (2019.01)
(58) Field of Classification Search
CPC ....................................................... G06F 16/23
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

Final Office Action for U.S. Appl. No. 15/445,625 dated Jun. 7, 2019, 11 pages.

(Continued)

*Primary Examiner* — Maher N Algibhah
(74) *Attorney, Agent, or Firm* — Kwan & Olynick LLP (57) ABSTRACT

Data field lifecycle management mechanisms. Custom metadata about a database object is generated. The custom metadata includes at least a specified name for the custom metadata type, a specified one or more fields to contain configuration information for the custom metadata type, and specification of at least one relationship field having fields as its domain relating the custom metadata type to a column or field of the database object stored in a database. One or more objects of the custom metadata type are maintained with referential integrity to provide metadata corresponding to the database object. The custom metadata objects maintain tenant-specific information. The one or more objects of the custom metadata type are updated automatically. A notification to one or more users is generated for one or more objects of the custom metadata type that cannot be updated automatically, if any.

18 Claims, 6 Drawing Sheets

| | | | | | | |
|---|---|---|---|---|---|---|
| | | | Account Data Dictionary | | | |
| Field Label | Field Name | Data Type | Fill Rate (April '16) | Definition/Description | Business Owner(s) | Field Sta |
| How the field is displayed in areas such as record detail pages, search results, and list views. | The name of the field as represented in the API. | Indicates the data type such as number or picklist. | Indicates the percent of total records in which the field has, as of date listed above. | Business description of th field - how it is populated and used | Name of field Owner and who to contact for questions on the field. | The Field s indicates whether the is unclame activity use standard, currently included i depreciati process. |
| Services Region | Services_Region_c | Text | | This field drives the services territory on account. It will initially tex Signals that there is active data migration asssociated t the account and to handle wit care in data quality management and merge exercises.(Count ofData Migration records with Data migration status = Active) When a Data Migration record associated to an account is either created, or the status changes from active to | Stacey | Active |

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0022302 A1 | 2/2005 | Johnson |
| 2005/0050555 A1 | 3/2005 | Exley et al. |
| 2005/0091098 A1 | 4/2005 | Brodersen et al. |
| 2005/0223022 A1 | 10/2005 | Weissman et al. |
| 2007/0179956 A1 | 8/2007 | Whitmyer |
| 2009/0017199 A1 | 1/2009 | Kotyakov |
| 2009/0171991 A1 | 7/2009 | Gitai et al. |
| 2009/0177744 A1 | 7/2009 | Marlow et al. |
| 2011/0231481 A1 | 9/2011 | Calahan |
| 2011/0276674 A1 | 11/2011 | Jensen-Horne et al. |
| 2011/0296380 A1 | 12/2011 | Dvinov et al. |
| 2012/0110020 A1 | 5/2012 | Weissman et al. |
| 2013/0036110 A1 | 2/2013 | Scott et al. |
| 2013/0117291 A1 | 5/2013 | Roy-Faderman |
| 2013/0232165 A1 | 9/2013 | Sharma |
| 2013/0304713 A1 | 11/2013 | Roy-Faderman |
| 2013/0347127 A1 | 12/2013 | Vedabrata et al. |
| 2014/0006441 A1 | 1/2014 | Torman et al. |
| 2014/0022951 A1 | 1/2014 | Lemieux |
| 2014/0157225 A1* | 6/2014 | Roy-Faderman ......... G06F 8/00 717/100 |
| 2014/0195644 A1 | 7/2014 | Marin et al. |
| 2014/0229511 A1 | 8/2014 | Tung et al. |
| 2015/0317350 A1 | 11/2015 | Roy-Faderman |
| 2016/0048844 A1 | 2/2016 | Vogt, Jr. et al. |
| 2016/0267294 A1 | 9/2016 | Weissman et al. |

OTHER PUBLICATIONS

Final Office Action for U.S. Appl. No. 15/445,625 dated Mar. 19, 2020, 13 pages.

Final Office Action for U.S. Appl. No. 15/631,250 dated Apr. 16, 2020, 11 pages.

Non-Final Office Action for U.S. Appl. No. 15/164,781 dated Jan. 16, 2018, 15 pages.

Non-Final Office Action for U.S. Appl. No. 15/445,625 dated Nov. 29, 2018, 19 pages.

Non-Final Office Action for U.S. Appl. No. 15/445,625 dated Sep. 4, 2019, 14 pages.

Non-Final Office Action for U.S. Appl. No. 15/631,250 dated Mar. 4, 2021, 18 pages.

Non-Final Office Action for U.S. Appl. No. 15/631,250 dated Sep. 20, 2019, 9 pages.

(56) References Cited

OTHER PUBLICATIONS

Notice of Allowance for U.S. Appl. No. 15/164,781 dated Jul. 3, 2018, 14 pages.
Notice of Allowance for U.S. Appl. No. 15/445,625 dated Oct. 1, 2020, 13 pages.
Notice of Allowance for U.S. Appl. No. 16/174,111 dated Oct. 30, 2019, 15 pages.
Notice of Allowance for U.S. Appl. No. 16/813,719 dated May 19, 2021, 15 pages.

* cited by examiner

Account Data Dictionary

| Field Label | Field Name | Data Type | Fill Rate (April '16) | Definition/Description | Business Owner(s) | Field Sta |
|---|---|---|---|---|---|---|
| How the field is displayed in areas such as record detail pages, search results, and list views. | The name of the field as represented in the API. | Indicates the data type such as number or picklist. | Indicates the percent of total records in which the field has, as of date listed above. | Business description of th field - how it is populated and used | Name of field Owner and who to contact for questions on the field. | The Field s indicates whether the is unclame activity use standard, currently included i depreciati process. |
| Services Region | Services_Region_c | Text | | This field drives the services territory on account. It will initially tex Signals that there is active data migration associated t the account and to handle wit care in data quality management and merge exercises.(Count of Data Migration records with Data migration status = Active) When a Data Migration record associated to an account is either created, or the status changes from active to | Stacey | Active |

TECHNIQUES AND ARCHITECTURES FOR DATA FIELD LIFECYCLE MANAGEMENT

CLAIM FOR PRIORITY

This application is a continuation of, and claims the benefit of, U.S. patent application Ser. No. 15/445,625 entitled "TECHNIQUES AND ARCHITECTURES FOR CROSS-ORGANIZATION THREAT DETECTION", filed Feb. 28, 2017, now U.S. Pat. No. 10,909,103 with an issue date of Feb. 2, 2021, the entire contents of which are incorporated herein by reference.

TECHNICAL FIELD

Embodiments relate to electronic data governance. More particularly, embodiments relate to techniques for efficiently managing data dictionaries and related metadata in complex environments.

BACKGROUND

When individuals/organizations/multitenant clients have large amounts of data, it is common for the management of that data to be complex and to be handled by multiple people. Further, inconsistent policies may be applied to data management/governance that may result in confusing, useless, stale, conflicting data. Data dictionaries are used to provide a central, accessible and reliable reference for metadata and other useful information. One basic approach to managing a data dictionary is to use a spreadsheet or other similar tool. However, as data repositories grow in size and complexity current techniques for managing data dictionaries become inefficient.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Conventionally, metadata has been used to describe data. The metadata, in some circumstances, can describe a format of the data, a type of the data, etc. However, techniques for defining metadata have generally exhibited various limitations. For example, the metadata itself has typically been incapable of being described by other metadata in a standard manner made available to third party developers of a platform maintaining the metadata. Various embodiments described herein utilize custom metadata types to, for example, manage a data dictionary. As another example, custom metadata types can be used to provide custom information related to graphical elements of a graphical user interface (GUI).

Various embodiments of custom metadata type are described in U.S. patent application Ser. No. 15/200,708, filed Jul. 1, 2016, entitled "Field Types Defined Via Custom Metadata Types," by Avrom Roy-Faderman, which is incorporated by reference herein. These mechanisms and methods for defining applications using metadata records created from an object specifying a predefined metadata format can enable embodiments to provide third party developers a manner of defining a custom format for metadata that is separate from any existing standard metadata formats that are part of a platform maintaining the metadata.

These custom metadata types can describe relationships with other data, but can only look up to metadata and not to data. In one embodiment, a data dictionary can have (and describe) relationships with other data. In the examples that follow specific names, types and interpretations are provided; however, these are intended to provide examples and not to be an exhaustive list.

Maintaining a data dictionary in a dynamic and complex environment can be challenging. For example, in situations where sandboxing is utilized and users (or the data dictionary) are created in one sandbox and some data is not copied over to another sandbox, the resulting lifecycle management solution that utilizes the data dictionary may be incomplete. For example, if a new user (e.g., an administrator) is created in a first sandbox (e.g., a development environment) and that user is the owner of a field that is subsequently deployed to a second sandbox (e.g., a production environment) where the owner does not exist, the resulting data dictionary is not accurate. This can lead to ineffective field management. There are other situations (whether utilizing sandboxing or not) that result in similar data dictionary complexities.

Figure 1:
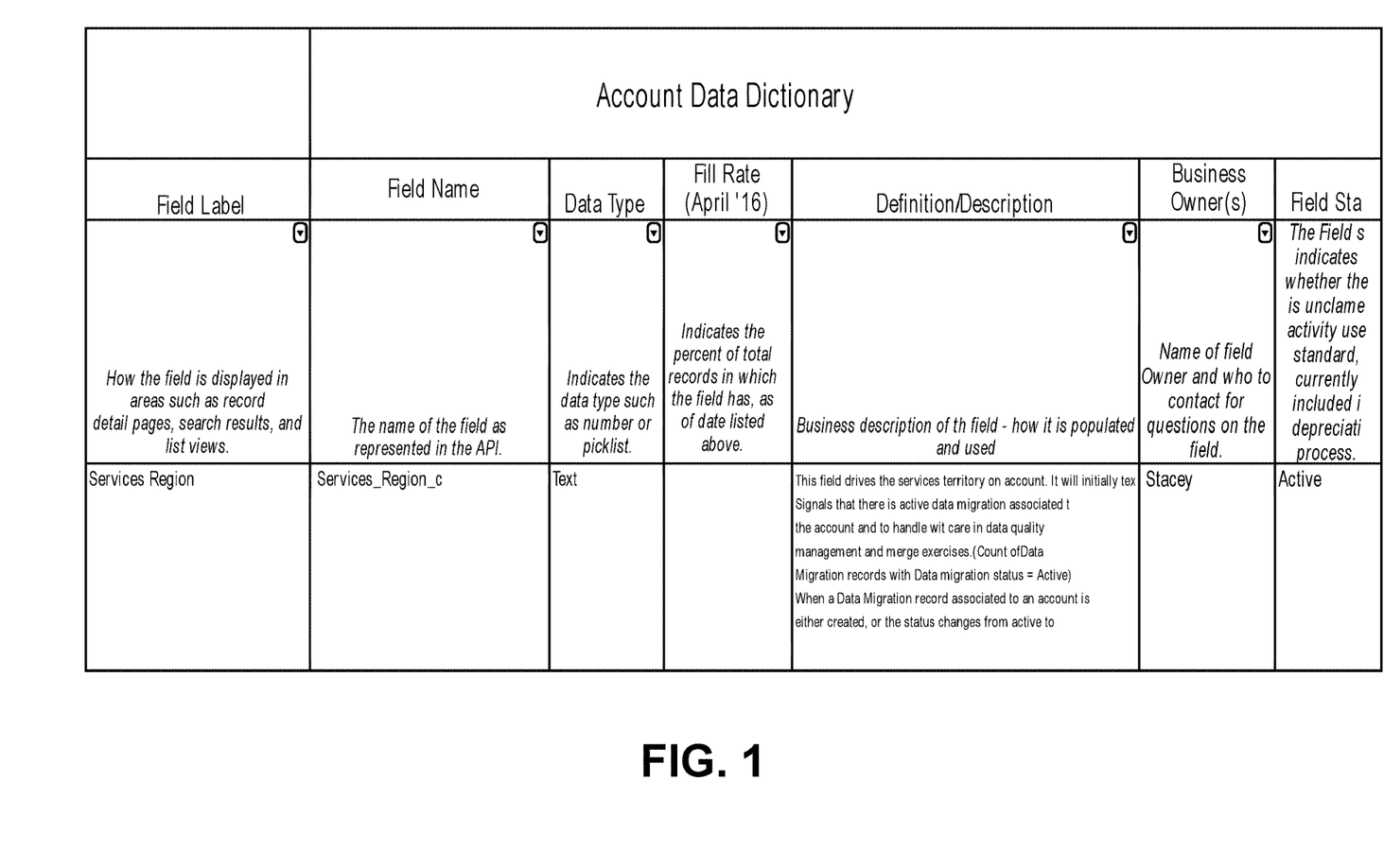
FIG. 1 is a simple example data dictionary that can be managed utilizing the techniques described herein.

FIG. 1 is a simple example data dictionary that can be managed utilizing the techniques described herein. In the example of FIG. 1, each object maintained within a data management environment can have associated metadata. Various embodiments of on-demand services environments that can utilize the techniques described herein are described in greater detail below.

In the example of FIG. 1, the Field Label describes how the field is displayed in areas such as record details, search results and lists (e.g., "Services Region"). The Field Name is the name of a field as represented within the metadata structure, for example, in an API (e.g., Services_Region_c). The Data Type indicates the data type (e.g., number, picklist, text). The Fill Rate indicates the percent of total records in which the field has been used. The Definition/Description indicates how the corresponding field is populated and used. The Business Owner(s) indicates names of one or more people responsible for the field. The Field Status indicates the current status of the corresponding field (e.g., Active, Inactive, Unknown).

In the example of FIG. 1, Fill Rate may be data rather than metadata and the fill rate would not be determined from a sandbox instance because the result may be "0" for every field. In this situation, if the fill rate were metadata, the fill rate calculated in a sandbox may overwrite the correct data that exists, for example, in a production environment. Thus, the techniques and structures described herein can provide a robust and efficient for data field lifecycle management.

In one embodiment, the data dictionary as described herein resides within the same service environment as the data being managed. For example, in multitenant on-demand services environments the data dictionary is stored and maintained within an environment (e.g., production environment, test environment) belonging to the organization/tenant that owns the data managed by the data dictionary.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

In addition to the fields listed above, additional and/or different fields can also be supported. These additional and/or different fields can include, for example, multiple date fields (e.g., date last viewed, last confirmed use), a date that a field was pulled from page layouts, work flows, reports, a date that a field was archived and the field deleted. Metadata about how a field is used can be maintained.

Figure 2A:
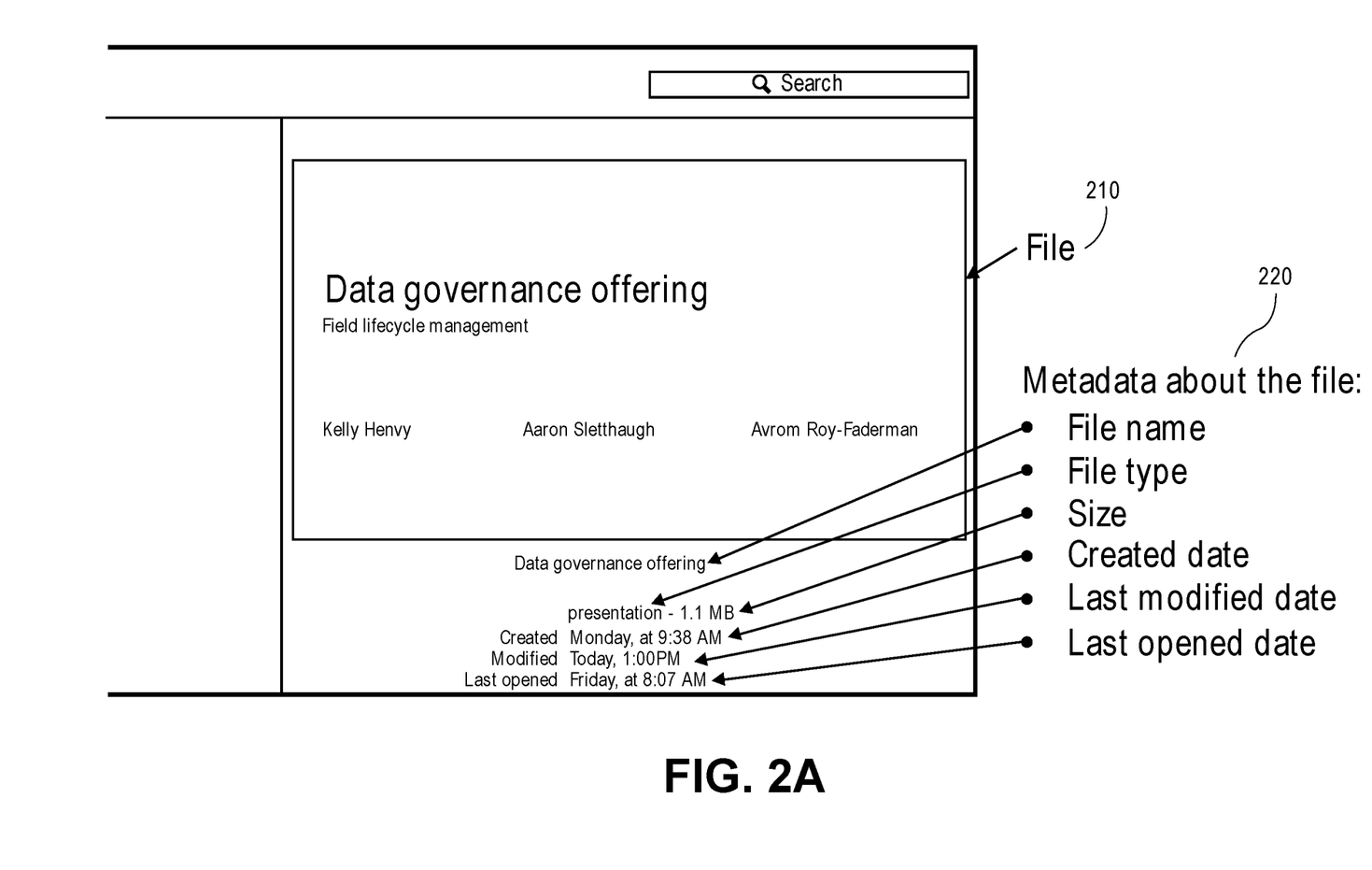
FIG. 2a provides a conceptual illustration of a file having associated metadata that is connected with the file.
Figure 2B:
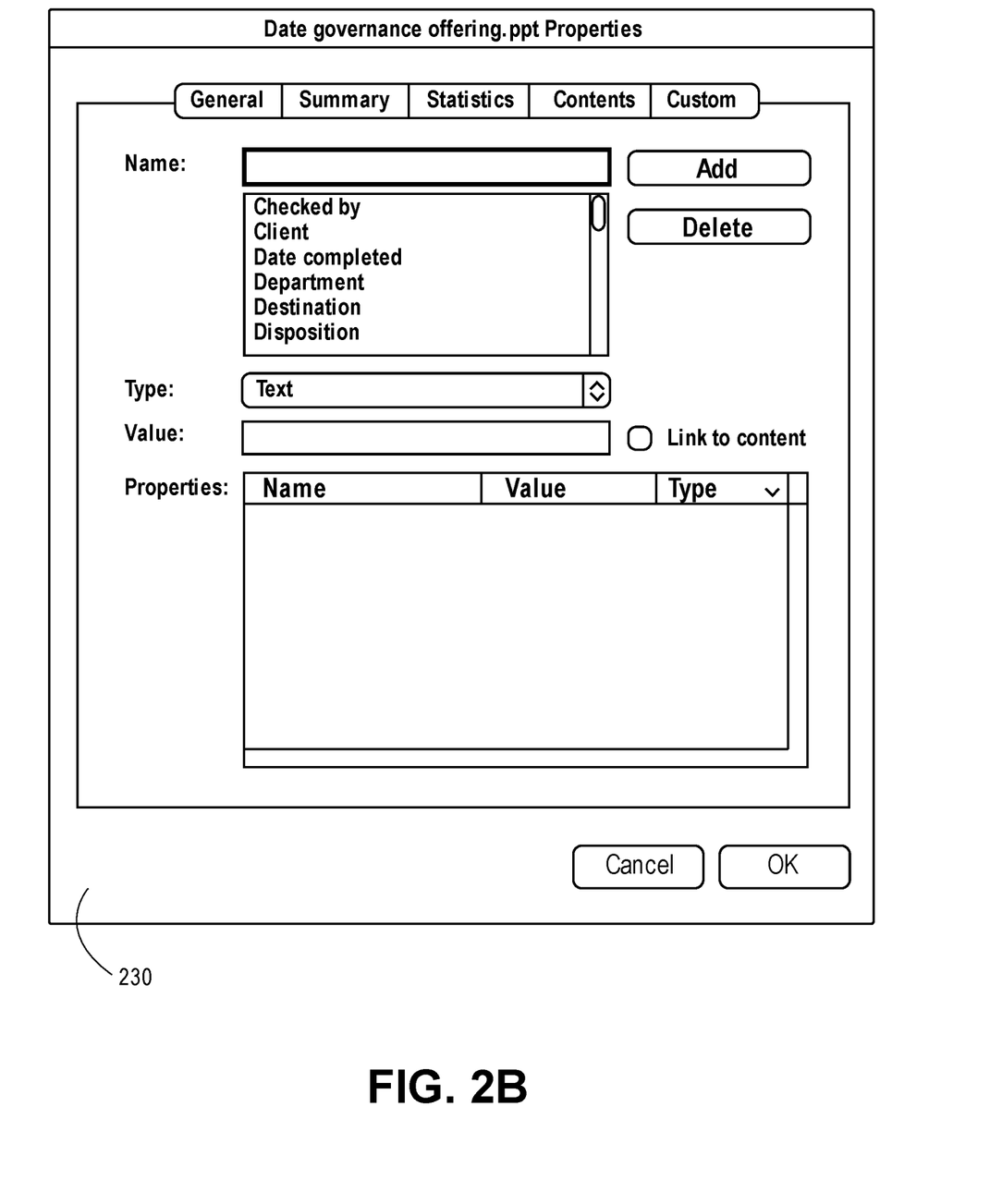
FIG. 2b provides a conceptual illustration of a graphical user interface to provide custom metadata.

FIG. 2a provides a conceptual illustration of a file having associated metadata that is connected with the file. In the example of FIGS. 2a and 2b, custom properties can be added to a file via a graphical user interface. The example of FIGS. 2a and 2b is just one simple example.

In the example of FIG. 2a file 210 provides various types of data depending on, for example, the file type. In the example of FIG. 2a, file 210 is a presentation type file; however, any file type can be supported using the techniques described herein. File 210 can have various types of metadata 220 associated with it. In the example of FIG. 2a, metadata 220 includes file name, file type, size, created data, last modified date, last opened date. Metadata 220 can represent standard metadata to be associated with the file.

File 210 can also have custom metadata associated with it. These custom properties stay connected to the file to provide referential integrity. In the example of FIG. 2b, properties window 230 can allow a user to enter custom metadata to be associated with file 210. Properties window 230 can be accessed by, for example, menu options in a graphical user interface. In one embodiment, the custom metadata are in addition to metadata 220 and can be used to provide additional (custom) information about file 210.

Figure 3:
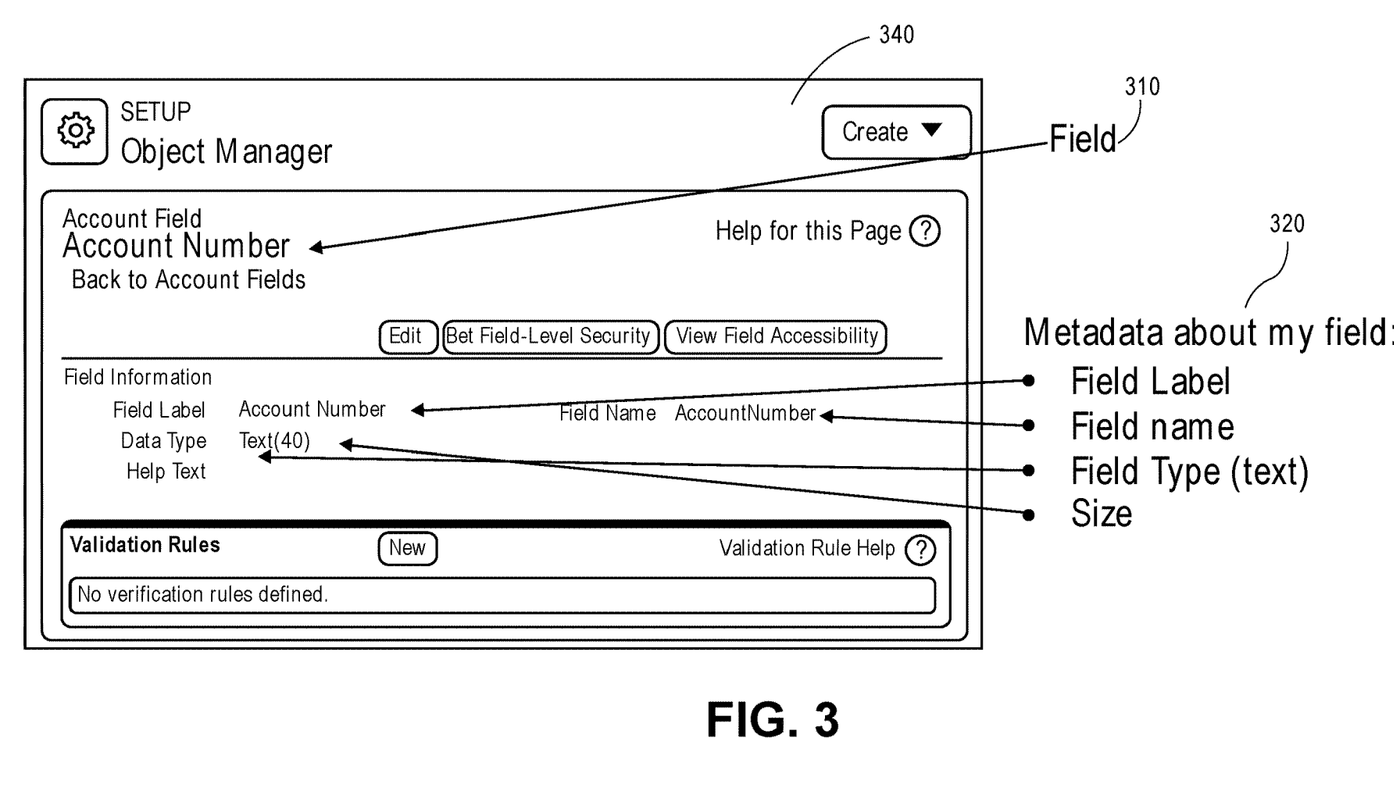
FIG. 3 provides a conceptual illustration of a field having associated metadata that is connected with the field.

FIG. 3 provides a conceptual illustration of a field having associated metadata that is connected with the field. In the example of FIG. 3, custom properties can be added to a field (or database object) via a graphical user interface. The example of FIG. 3 is just one simple example. Many types of custom properties can be supported using the techniques described herein.

Using current techniques, custom properties (custom metadata) cannot be added to custom fields using native mechanisms. However, custom properties (custom metadata) can be created and maintained with the field (or database object) using custom metadata types. This can provide referential integrity and can allow for automation of the data dictionary.

In the example of FIG. 3, field 310 (e.g., Account Number) can be configured/set up using window 340 of a graphical user interface. In one embodiment, window 340 allows a user to configure objects to be used within a computing environment (e.g., an on demand services environment that can include a multitenant database as described in greater detail below). In the example of FIG. 3, field 310 can have associated metadata 320, which can include, for example, a field label, a field name, a field type and a size. Other and/or different metadata can be supported in a similar manner.

While many kinds of custom properties can be managed using custom metadata types, the following examples provide a few useful examples that can be utilized in a multi-tenant environment. A data owner (or data steward) that is responsible for the corresponding field (or object) can be maintained. As a more complex example, a fill rate can be supported that indicates the number (or percentage) of records utilizing the corresponding field. A low fill rate can indicate, for example, underutilization, poor execution or lack of support for the field. A security level can be associated with the field (or object). For example, a picklist with several security levels (e.g., public, internal, confidential, restricted, mission critical) can be supported.

Further, multiple date fields (e.g., date last viewed, date last modified, date of stage one retirement, date of stage two retirement) can be utilized to provide additional useful date information. Custom properties can provide information regarding where the field (or data in the field) was last used, a source of data for the field, and workflow rules that utilize the data.

Figure 4:
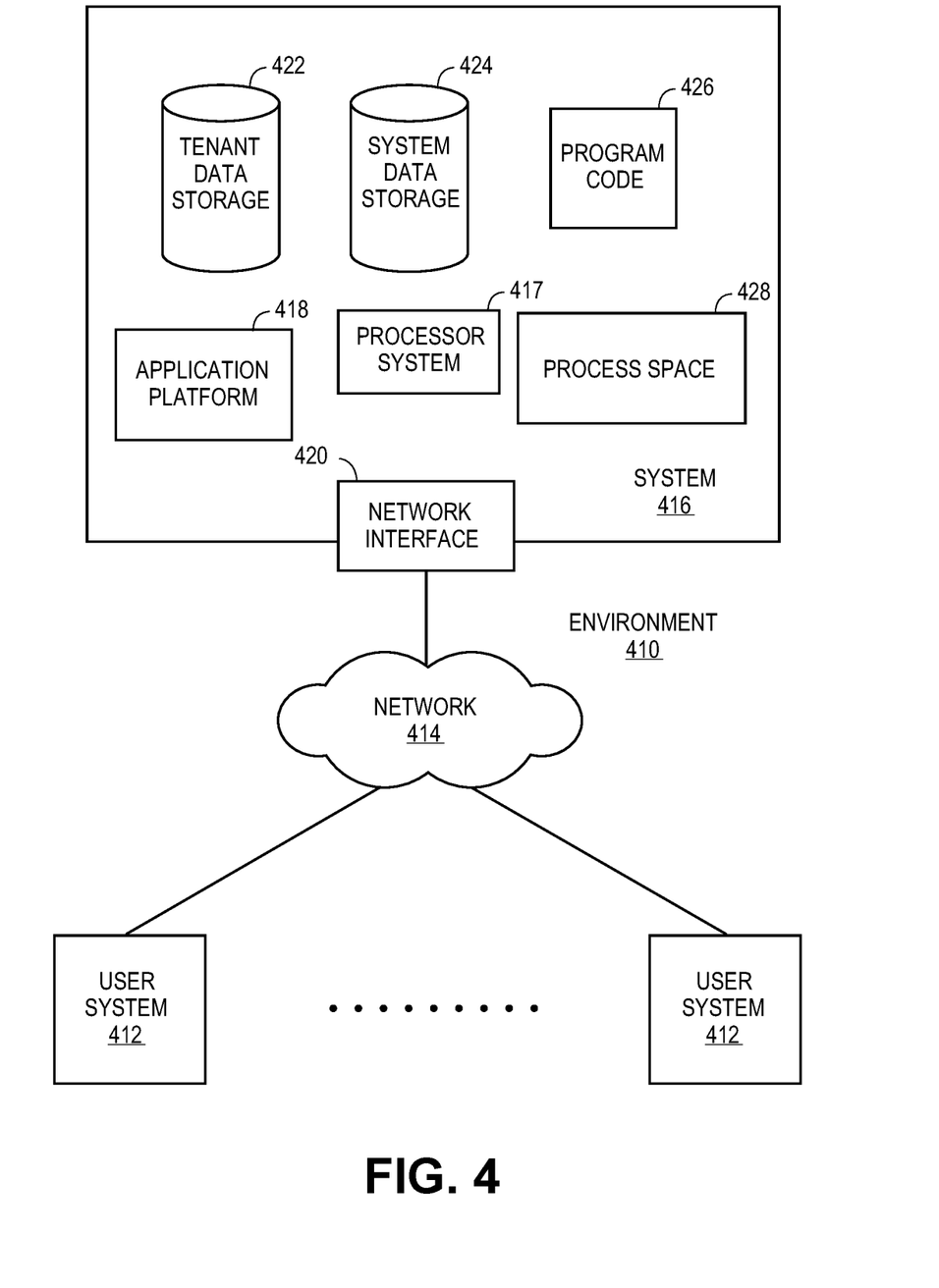
FIG. 4 illustrates a block diagram of an environment where an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Core series processor or the like. Similarly, system 416 (and additional instances of an MTS, where more than one is present) and all of their components might be operator configurable using application(s) including computer code to run using a central processing unit such as processor system 417, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
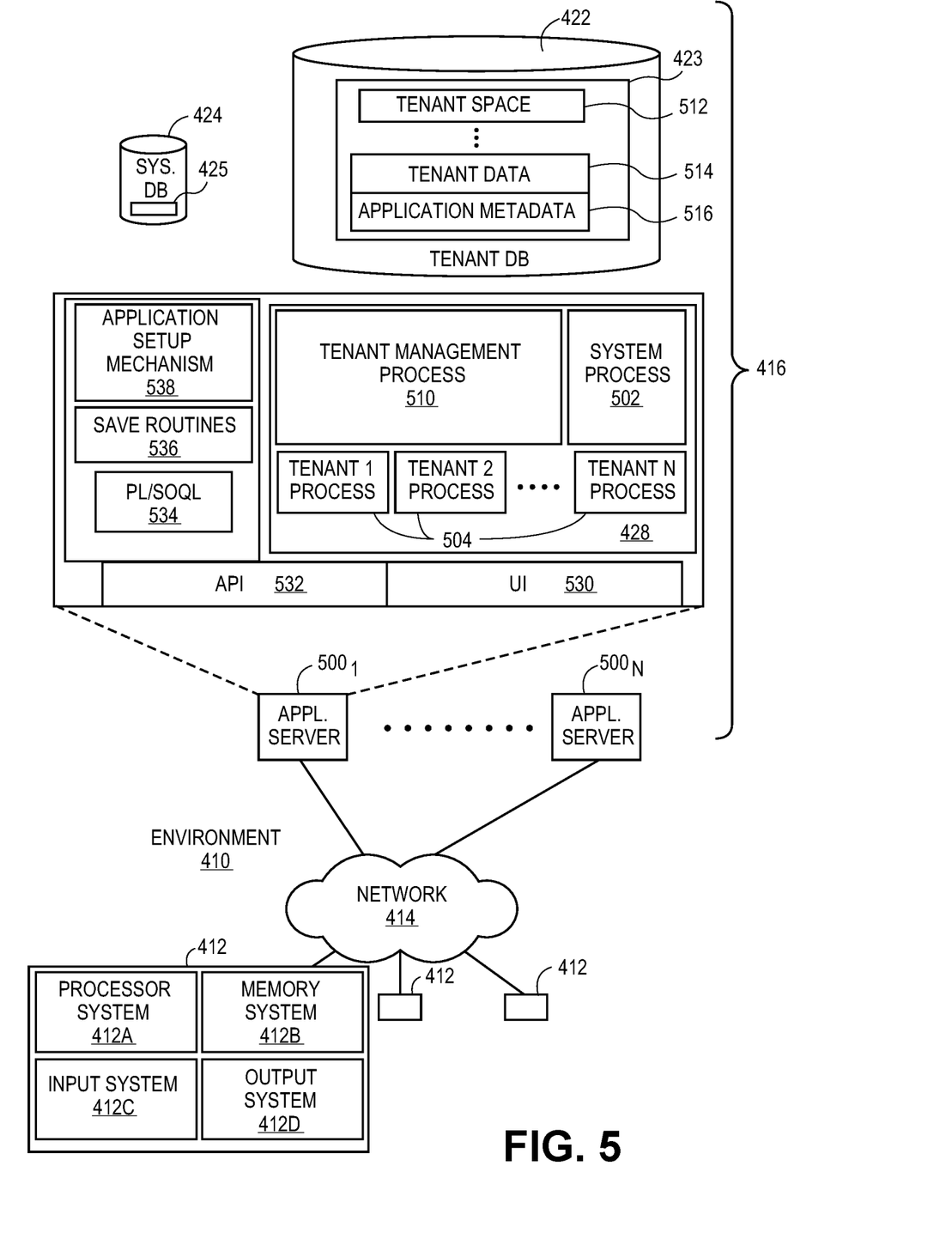
FIG. 5 illustrates a block diagram of an environment where an on-demand database service might be used.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$400_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server 500$_{N-1}$ might be coupled via a direct network link, and another application server 500$_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 BIG-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that when executed by one or more processors, are configurable to cause the one or more processors to:

maintain a data dictionary within a multitenant computing system in which multiple tenants share a single instance of a database, the data dictionary being stored and maintained within an area of the multitenant computing system accessible to a tenant associated with data managed by the data dictionary generate custom metadata about a database object associated with the tenant, wherein the database object has corresponding objects within the area of the system accessible to the tenant, wherein the custom metadata describes one or more relationships with other data, the custom metadata is specific to the tenant, and the custom metadata is in addition to standard metadata for the database object;

generate one or more custom metadata types based on the custom metadata, wherein the data dictionary maintains:

a connection between selected custom metadata types and a file utilizing the selected custom metadata types;

upon receiving an update to the custom metadata, update, automatically, one or more objects of the custom metadata types within the data dictionary, wherein a database object has corresponding objects in at least two different sandboxes within the multitenant computing system; and generate a notification to one or more users for objects of the custom metadata types within the data dictionary that cannot be updated automatically, if any.

2. The non-transitory computer-readable medium of claim 1, wherein the custom metadata comprises an indication of one or more people responsible for a field.

3. The non-transitory computer-readable medium of claim 1, wherein the custom metadata comprises an indication of a current status of a corresponding field.

4. The non-transitory computer-readable medium of claim 1, wherein the custom metadata types can describe relationships with other data, but can only be used to look up metadata and not data.

5. The non-transitory computer-readable medium of claim 1, wherein the custom metadata objects comprise at least a fill rate that indicates a percent of total records in which a field has been used.

6. The non-statutory computer-readable medium of claim 1, wherein the custom metadata types correspond to record fields.

7. A method comprising:

maintaining a data dictionary within a multitenant computing system in which multiple tenants share a single instance of a database, the data dictionary being stored and maintained within an area of the multitenant computing system accessible to a tenant associated with data managed by the data dictionary;

generating custom metadata about a database object, wherein the database object has corresponding objects in at least two sandboxes within the environment belonging to the tenant, wherein the custom metadata types describe relationships with other data and the custom metadata types are specific to the tenant and in addition to standard metadata for the database object;

generating one or more custom metadata types based on the custom metadata, wherein the data dictionary maintains:

a connection between selected custom metadata types and a file utilizing the selected custom metadata types;

updating, automatically, one or more objects of the custom metadata types within the data dictionary, wherein a database object has corresponding objects in at least two different sandboxes within the multitenant computing system; and generating a notification to one or more users for objects of the custom metadata types within the data dictionary that cannot be updated automatically, if any.

8. The method of claim 7, wherein the custom metadata comprises an indication of one or more people responsible for a field.

9. The method of claim 7, wherein the custom metadata comprises an indication of a current status of a corresponding field.

10. The method of claim 7, wherein the custom metadata types can describe relationships with other data, but can only be used to look up metadata and not data.

11. The method of claim 7, wherein the custom metadata objects comprise at least a fill rate that indicates a percent of total records in which a field has been used.

12. The method of claim 7, wherein the custom metadata types correspond to record fields.

13. A system, comprising: at least one memory device;

one or more hardware processors configurable to:

maintain a data dictionary within a multitenant computing system in which multiple tenants share a single instance of a database, the data dictionary being stored and maintained within an area of the multitenant computing system accessible to a tenant associated with data managed by the data dictionary;

generate custom metadata about a database object associated with the tenant, wherein the database object has corresponding objects within the area of the system accessible to the tenant, wherein the custom metadata describes one or more relationships with other data, the custom metadata is specific to the tenant, and the custom metadata is in addition to standard metadata for the database object;

generate one or more custom metadata types based on the custom metadata, wherein the data dictionary maintains:

a connection between selected custom metadata types and a file utilizing the selected custom metadata types;

upon receiving an update to the custom metadata, update, automatically, one or more objects of the custom metadata types within the data dictionary, wherein a database object has corresponding objects in at least two different sandboxes within the multitenant computing system; and generate a notification to one or more users for objects of the custom metadata types within the data dictionary that cannot be updated automatically, if any.

14. The system of claim 13, wherein the custom metadata comprises an indication of one or more people responsible for a field.

15. The system of claim 13, wherein the custom metadata comprises an indication of a current status of a corresponding field.

16. The system of claim 13, wherein the custom metadata types can describe relationships with other data, but can only be used to look up metadata and not data.

17. The system of claim 13, wherein the custom metadata objects comprise at least a fill rate that indicates a percent of total records in which a field has been used.

18. The system of claim 13, wherein the custom metadata types correspond to record fields.

* * * * *

UNITED STATES PATENT AND TRADEMARK OFFICE
CERTIFICATE OF CORRECTION

PATENT NO. : 12,032,551 B2
APPLICATION NO. : 17/164733
DATED : July 9, 2024
INVENTOR(S) : Kelly Henvy et al.

Page 1 of 1

It is certified that error appears in the above-identified patent and that said Letters Patent is hereby corrected as shown below:

In the Claims

In Claim 6, Column 11, Line 40, please change "non-statutory" to --non-transitory--

Signed and Sealed this
Twentieth Day of May, 2025

Coke Morgan Stewart
*Acting Director of the United States Patent and Trademark Office*